March 3, 1953 W. T. REDMOND 2,630,513
ARGON GAS FEED APPARATUS FOR ELECTRODES
Filed April 16, 1951 2 SHEETS—SHEET 1
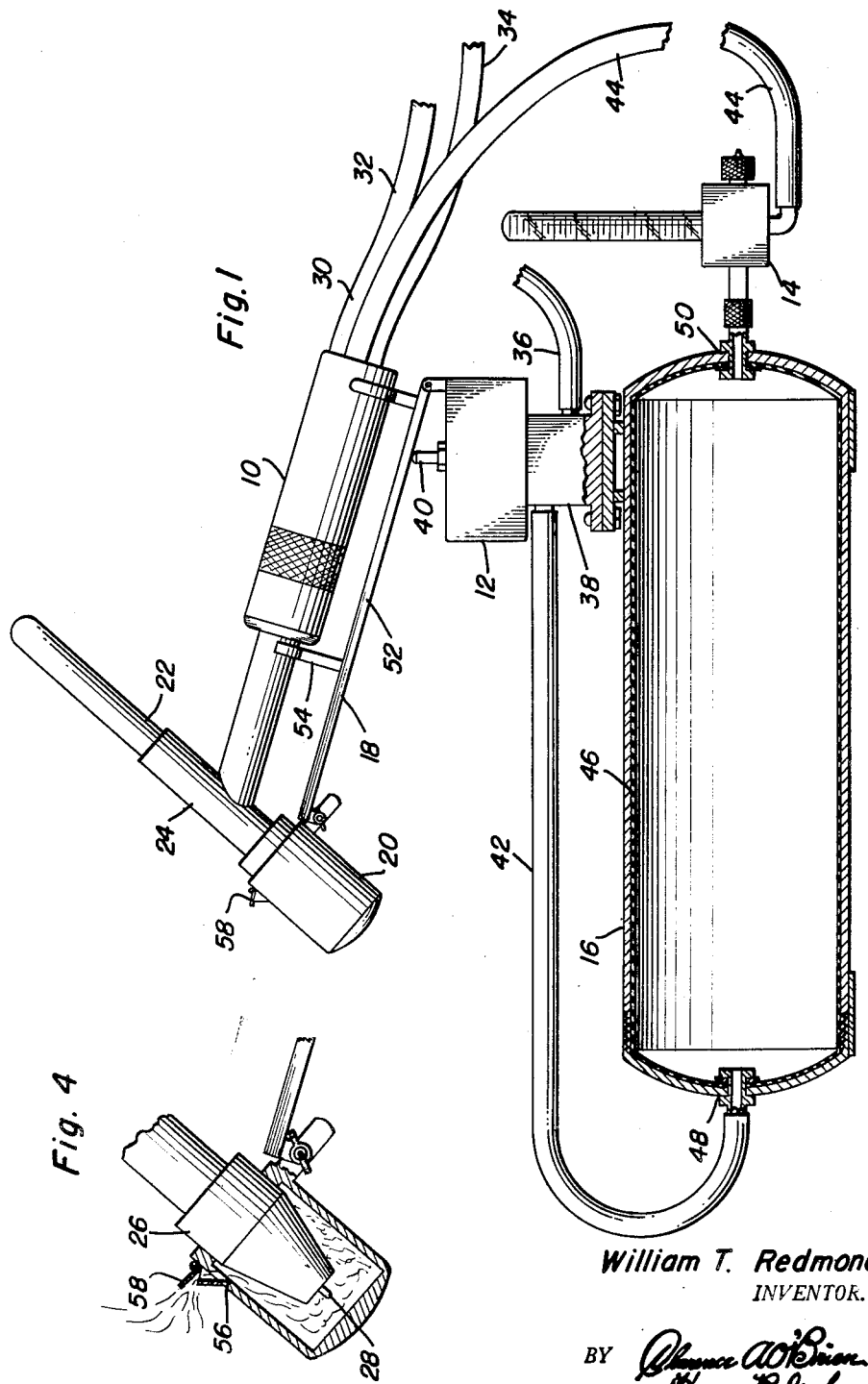
William T. Redmond
INVENTOR.

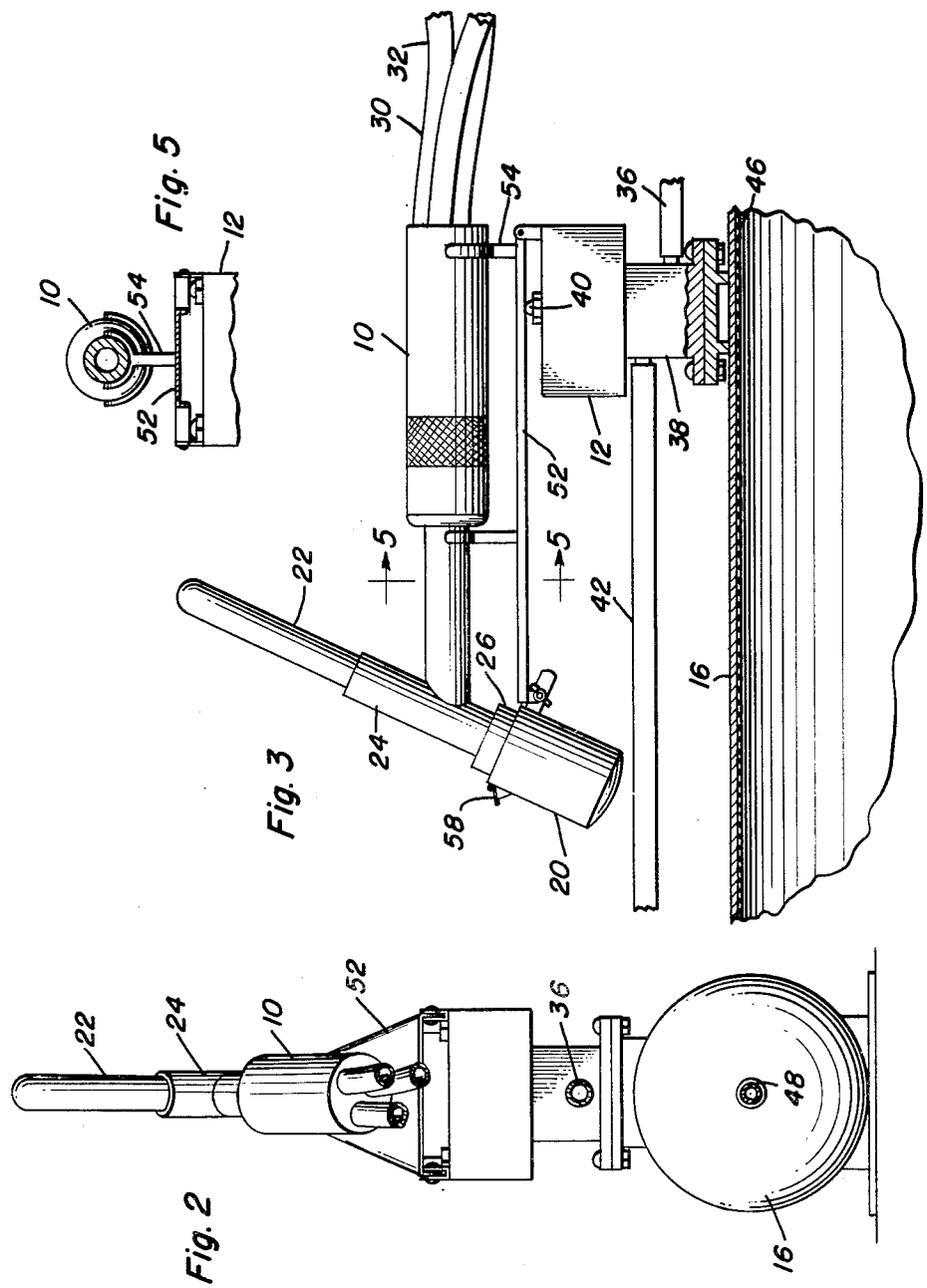

Patented Mar. 3, 1953

2,630,513

UNITED STATES PATENT OFFICE 2,630,513

ARGON GAS FEED APPARATUS FOR ELECTRODES

William T. Redmond, Kennewick, Wash.

Application April 16, 1951, Serial No. 221,166

5 Claims. (Cl. 219—8)

This invention comprises new and useful improvements in a welding apparatus and more specifically pertains to a means for preserving the tip of a metallic electrode.

It is well known that a heated metal will chemically unite with the components of the atmosphere surrounding it and will thereby form oxides and the like in the metal. Such a reaction results in contaminating the metal and thereby lessening its resistance to corrosion.

It is further known that a welding process has been devised to shield the welding arc from the surrounding atmosphere and thus prevent the injurious chemical combination. This process consists of completely shielding or enveloping the tungsten electrode or the like with an inert gas which will not combine with the metal electrode and will at the same time prevent contact of the heated metal with the surrounding air.

It has been found, however, that oxidation of the tungsten electrode will occur while the same is cooling, that is, after the electric current and gas supply have been disconnected. Although it is realized that this could be corrected by leaving the gas on after the current is turned off and until the electrode is cooled, nevertheless it is believed that such practice would result in undue consumption and waste of the gas and, further, would require the observation and time of the operator.

Accordingly, the primary object of this invention is to provide a means for preventing oxidation of a tungsten electrode in a shielded arc type of welding apparatus, particularly during the cooling-off period.

A further object is to provide a means as set forth in the preceding paragraph which will perform such a function automatically upon shutting off the gas supply.

Yet another object is to provide such a device as set forth above which will not only conserve the gaseous fuel utilized in the equipment but also will require less time in supervision than the methods of the prior art devices.

These, together with various ancillary objects and features of the invention which will later become apparent as the following description proceeds, are attained by the device, a preferred embodiment of which has been illustrated, by way of example only, in the accompanying drawings, wherein:

Figure 1 is a vertical side view of the entire apparatus comprising the instant invention and showing a portion of the invention in crosssection;

Figure 2 is a rear vertical view as may be seen by observing the device of Figure 1 from the right-hand portion thereof;

Figure 3 is a partial side vertical view of the device as found in Figure 1 and illustrating a different operative position thereof;

Figure 4 is a fragmentary detail sectional view showing the structure surrounding the electrode tip; and Figure 5 is a vertical fragmentary sectional view taken along the plane of the section line 5—5 of Figure 3.

Referring now more specifically to the accompanying drawings, wherein like numerals designate similar parts throughout the various views, it will be noted that the instant invention consists generally of a welding torch 10, a control valve 12, a flow meter 14, and various gas, cooling water, and electric current supply lines to be distinguished in the subsequent discussion.

The parts of the invention believed to be the novel improvements over the conventional helium or argon arc type of welding apparatus include a storge tank or receiver 16, a torch holder 18, and a protective cup 20.

As is well known, the shielded arc type of welding equipment is constructed to operate substantially as follows: A tungsten electrode or the like 22 is disposed in suitable cylindrical framework 24 of the torch body and has a protective ceramic cup 26 fitted over its lower end in the conventional manner. The tip 28 of the electrode extends for the required distance outwardly of the ceramic cup 26 and is supplied with the necessary voltage to produce a welding current by means of the conductor 30.

Although it is not intended to be a portion of the instant invention, it should be noted that a cooling water system is provided for the torch, the inlet and outlet tubes being denoted by the numerals 32 and 34, respectively.

To aid in the prevention of corrosion and the like during the welding process, and especially to prevent contamination in the welded joint, the shielded arc type of welding equipment provides a curtain or envelope of inert gas around the electrode tip 28. This is achieved by concentrically spacing the electrode tip from the adjacent surrounding surface of the protective cup 26 and the space or opening defined therebetween is constructed to register or communicate with the helium or argon gas delivery line. This delivery line consists essentially of an inlet gas supply section 36, an on and off-control valve 38 being operatively actuated by the plunger 40, a connecting section 42, the flow meter 14 and the direct lead-in line 44 to the torch 10. By reference to the patent to R. Meredith, No. 2,342,086, a more specific explanation and discussion of the construction and operation of the shielded arc type of welding apparatus will be found.

Although contamination and possible corrosion are substantially eliminated during the welding process, it has been found that when the electric current and gas supply are disconnected, and while the electrode tip is cooling, oxidation will still occur to a detrimental degree. To counteract this effect, it has been necessary to allow the gas to flow after the electric current has been turned off and until the electrode has cooled sufficiently. However, this procedure has not only consumed and wasted a substantial amount of gas, but has also consumed much of the operator's valuable time. Accordingly, it would appear to be a desirable improvement if a means could be devised to simultaneously turn the main supply of gas off and yet keep a predetermined amount of gas flowing which would, in combination with an enclosing chamber, sufficiently envelop and shield the electrode tip until the same has cooled.

With this in mind, a storage tank 16 was interposed between the connecting line 42 and the flow meter 14. The storage tank 16 is a rigid metallic framework substantially cylindrical in cross-section and is adapted to receive an inflatable sack 46 in such a manner that when the sack 46 is completely expanded, it will substantially line the inner wall of the tank 16. Inlet and outlet ports 48 and 50, respectively, are provided in both the tank and sack and the same are provided with the necessary coupling connections.

Pivotally mounted at the rear of the control valve 12 is the flat base member 52 of the holder stand 18. At properly spaced intervals along the base 52 are upwardly extending bifurcated elements 54 having arcuated recesses at the upper ends thereof for reception of the various portions of the torch 10. At the outer end of the base 52 is an adjustably pivotally connected protective cup member 20 constructed to snugly embrace the ceramic cup 26 on the presently used conventional equipment. The protective cup 20 is provided with an outlet port 56 which has a freely pivotal closure member 58 thereon.

The operation of the device will now be clearly understood. When any particular welding job is finished, the electric current supply line is disconnected and the body of the torch 10 is laid upon the provided members 54 of the holder 18 and the ceramic cup 26 is fitted within the outer protective cup 20, as seen in the illustration of Figure 1. The downward pressure on the control valve plunger 40 will now be sufficient to depress the latter and thereby close the control valve 38 for the gas supply line, as exemplified by the illustration in Figure 3.

Since, during the operation of the device, the inflatable sack 46 was completely expanded, the sack 46 contains a quantity of the inert gas at the supply line pressure. Therefore, when the gas supply line is shut off at the inlet port 48 of the sack 46, contraction of the sack will occur and such will tend to continue the flow of gas in the line 44 at a pressure determined by the flow meter 14 and until the sack 46 has contracted to a predetermined size.

Since the electrode tip 28 is inside of the protective cup 20 and since the surrounding space is filled with the inert gas, sufficient cooling of the electrode tip 28 will occur before the components of the atmosphere can pierce the shield of inert gas to combine with the hot metal.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to falling within the scope of the appended claims.

Having described the invention, what is claimed as new is:

1. In a welding torch having a metallic electrode, an insulating tube surrounding said electrode and defining an annular passage therebetween, means for inhibiting contamination of said electrode comprising a source of inert gas under pressure, a gas delivery line connected from said source to said passage, a control valve in said line, a gas storing means connected to said line between said valve and said passage, a flow meter interposed in said line between said storing means and said passage, said storing means including an inflatable sack, said sack being encased in a container having a rigid frame.

2. In a welding torch having a metallic electrode, an insulating tube surrounding said electrode and defining an annular passage therebetween, means for inhibiting contamination of said electrode comprising a source of inert gas under pressure, a gas delivery line connected from said source to said passage, a control valve in said line, a gas storing means connected to said line between said valve and said passage, a flow meter interposed in said line between said storing means and said passage, said storing means including an inflatable sack, said sack being encased in a container having a rigid frame, inlet and outlet ports provided in said sack and container, said sack and container being connected at said ports.

3. In a welding torch having a metallic electrode, an insulating tube surrounding said electrode and defining an annular passage therebetween, means for inhibiting contamination of said electrode comprising a source of inert gas under pressure, a gas delivery line connected from said source to said passage, a control valve in said line, a gas storing means connected to said line between said valve and said passage, a flow meter interposed in said line between said storing means and said passage, a holder for said electrode, said control valve comprising a spring-urged plunger, means for depressing said plunger comprising a pivotally mounted stand, said stand having a bracket thereon for receiving said electrode holder whereby upon reception thereof said stand will depress said plunger, said shielding means including a protective cup for housing said electrode and being pivotally mounted on said stand.

4. In a welding torch having a metallic electrode, an insulating tube surrounding said electrode and defining an annular passage therebetween, means for inhibiting contamination of said electrode comprising a source of inert gas under pressure, a gas delivery line connected from said source to said passage, a control valve in said line, a gas storing means connected to said line between said valve and said passage, a flow meter interposed in said line between said storing means and said passage, a control plunger for said valve, an actuating lever for said plunger, torch receiving means on said lever, a protective cup secured on said lever to snugly embrace said tube when said torch is placed on said receiving means.

5. In a welding torch having a metallic electrode, an insulating tube surrounding said electrode and defining an annular passage therebetween, means for inhibiting contamination of said electrode comprising a source of inert gas under pressure, a gas delivery line connected from said source to said passage, a control valve in said line, a gas storing means connected to said line between said valve and said passage, a flow meter interposed in said line between said storing means and said passage, a cup snugly embracing said insulating tube, said cup having a gas outlet therein, and a closure for said outlet.

WILLIAM T. REDMOND.

REFERENCES CITED

The following references are of record in the file of this patent:

UNITED STATES PATENTS

| Number | Name | Date |
|---|---|---|
| 1,804,269 | O'Connell | May 5, 1931 |
| 2,498,366 | Greer | Feb. 21, 1950 |
| 2,572,190 | Patrick | Oct. 23, 195· |

FOREIGN PATENTS

| Number | Country | Date |
|---|---|---|
| 863,983 | France | Jan. 8, 1941 |